Dec. 6, 1966 W. R. FUERST 3,289,948
ELECTRIC REMOTE DISPENSER VALVE
Filed Dec. 23, 1964 3 Sheets-Sheet 1

INVENTOR.
WILLIAM R. FUERST
BY
ATTORNEYS

Dec. 6, 1966  W. R. FUERST  3,289,948
ELECTRIC REMOTE DISPENSER VALVE
Filed Dec. 23, 1964  3 Sheets-Sheet 2
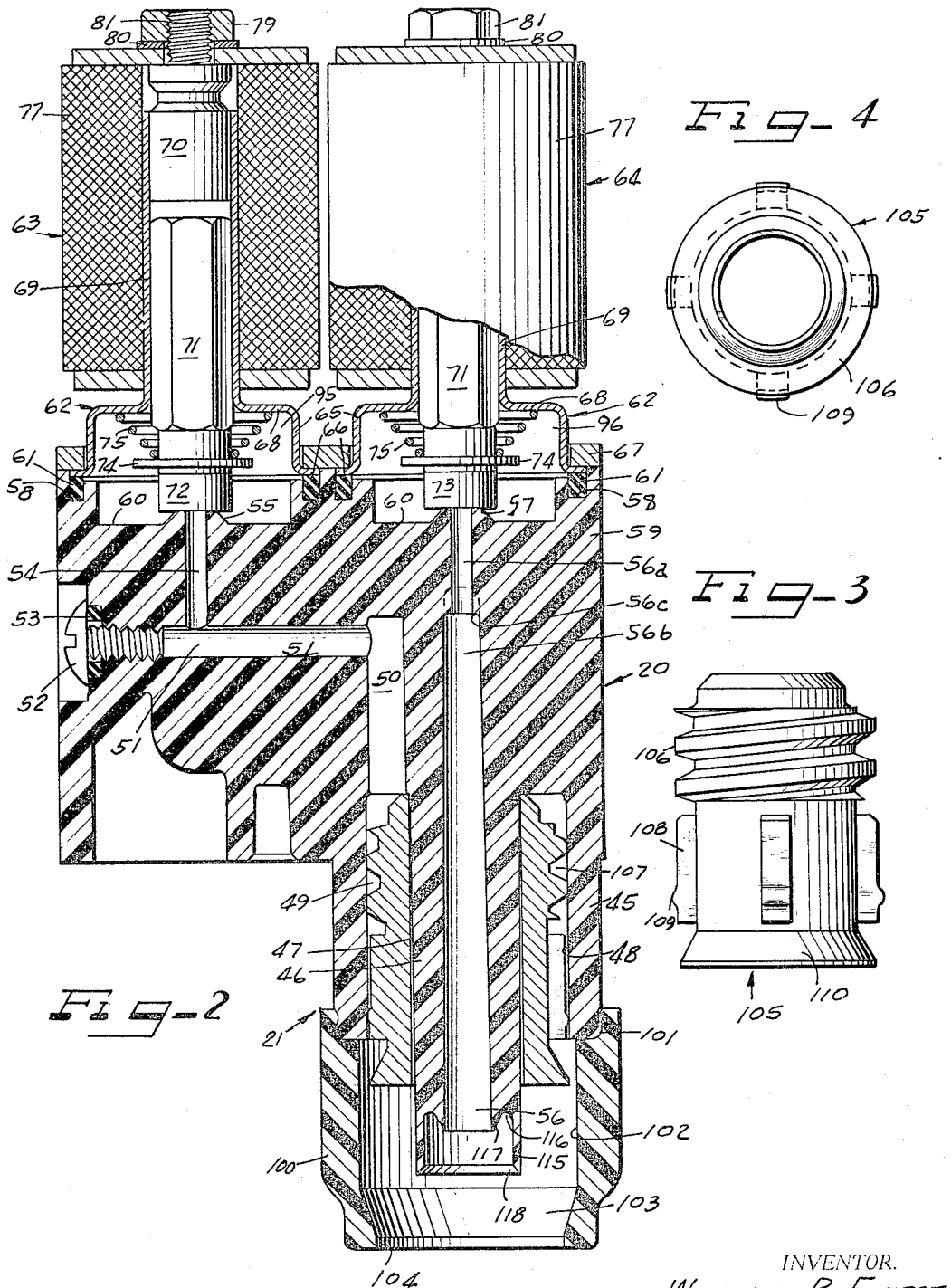
INVENTOR.
WILLIAM R. FUERST
BY
ATTORNEYS

INVENTOR.
WILLIAM R. FUERST

United States Patent Office 3,289,948
Patented Dec. 6, 1966

3,289,948
ELECTRIC REMOTE DISPENSER VALVE
William R. Fuerst, Skokie, Ill., assignor to The Dole Valve Company, Morton Grove, Ill., a corporation of Illinois
Filed Dec. 23, 1964, Ser. No. 420,521
5 Claims. (Cl. 239—406)

This invention relates to a liquid dispenser and more particularly to an improved liquid dispenser having: a constant rate of flow while maintaining a relatively low outlet fluid velocity, an outlet flow isolated from flow to adjacent outlets, and a device to regulate the effervescent rate of a gas impregnated liquid such as carbonated water.

It is common in a liquid dispenser to employ constant rate of flow devices. Such devices are particularly important to dispensers with respect to the function of mixing liquids at a fixed ratio. Heretofore, attempts at regulating the dispensing rate of fluids have resulted in the locating of flow-control devices in the outlet vicinity; this being the obvious location as all flow variation factors upstream of the outlet are eliminated. The net effect, however, has not proven entirely satisfactory in that the constriction necessarily imposed upon a line by the presence of a flow control device develops a high velocity liquid head giving rise to a foaming and dripping problem at the outlet.

In addition, current dispensers designed to facilitate the mixing of liquids have not always been able to respond in a completely satisfactory manner when only a single rather than a combined flow is required. Designing for mixing has entailed the proximate associating of several outlets with the result that liquid deposits retained at a non-operative outlet through surface tension or internal pressure tend to be washed and commingled with adjacent outlet flows. Thus, entirely independent flow of liquid has been limited by a certain contamination factor.

Also, where a gas impregnated liquid such as carbonated water is to be dispensed it has been found desirable to employ a means for regulating the gaseous content of the liquid. Herein such a means is referred to as an effervescent control.

It is a principal object of my invention to provide a liquid dispenser which includes means for mixing liquids from separate sources and which includes means for controlling the rate of flow of those liquids and yet which eliminates the undesirable characteristics heretofore associated with the use of flow control devices at the dispenser outlet.

It is also an object of this invention to provide a liquid dispenser capable of dispensing liquids simultaneously as in a mixing function without disrupting its ability to dispense liquids separately free from the contaminating effects of liquid deposits retained at adjacent outlets.

It is a further object of this invention to provide a liquid dispenser employing adaptors functioning as effervescent controls to regulate the gaseous content of dispensed liquids.

A preferred embodiment of this invention is illustrated in a bench-type liquid dispenser intended for dispensing and mixing a syrup and carbonated water in the form of a soft drink, but it will be apparent that the various features of this invention are applicable to other types of machinery.

Further features, objects and advantages of this invention will be understood from the following references to the associated drawings in which the preferred embodiment is indicated.

FIGURE 2 is a vertical sectional view of a dispenser body as employed in the liquid dispenser of FIGURE 1 showing some parts in elevation and illustrating the positioning of a changeable effervescent control as employed within an outlet passageway;

FIGURE 3 is a side elevational view of the changeable effervescent control employed in FIGURE 2;

FIGURE 4 is a top view of the effervescent control of FIGURE 3;

Figure 1:
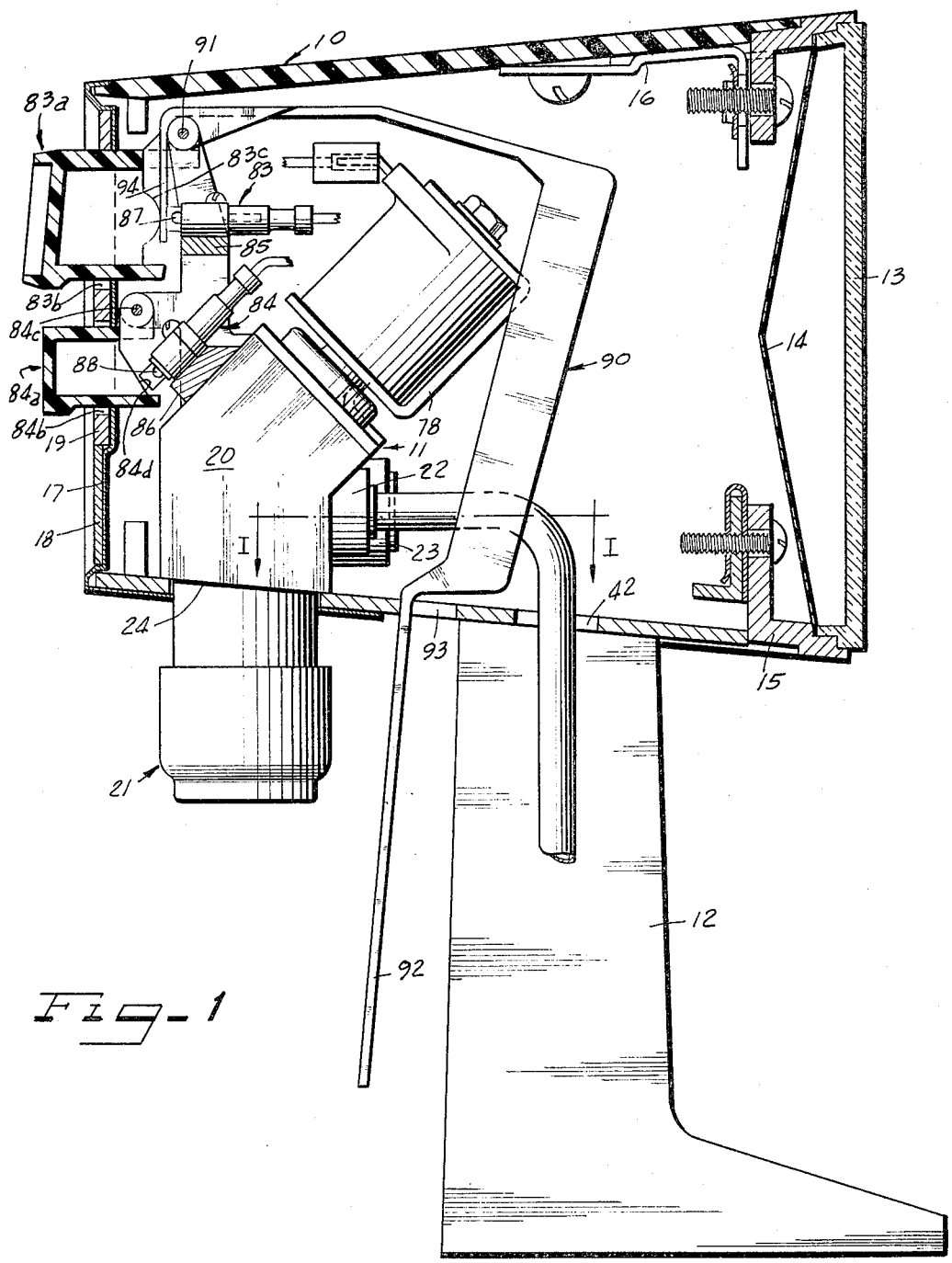
FIGURE 1 is a cross-sectional view of a liquid dispenser according to this invention showing the arrangement of its principal elements.

In the embodiment of the invention illustrated in the drawings there is shown a casing 10 which carries a dispensing unit 11 and which is supported on a stand 12 in a conventional manner. The rear face of the casing 10 is defined by a transparent panel 13 which is fitted over a display panel 14 which, in turn, is carried by a bracket 15. The bracket 15 is in turn connected to the main body of the casing 10 by a mounting bracket 16 secured to the bracket 15 and body of the casing 10 by screws as shown. An end plate 17 is fitted over the opposite end of the casing 10 and extends along the under surface thereof. Decorative metal plates 18 and 19 are fitted on the plate 17.

The dispensing unit 11 comprises generally a dispensing body 20 having an outlet faucet 21 and side-by-side inlets 22 and 23 and has an annular shoulder 24 formed around the faucet end thereof which is seated upon the upper inner surface of the lower wall of the casing 10. The dispensing body is maintained in the fixed position shown in FIGURE 1 by suitable means not herein shown or described.

The inlets 22, 23 differ in size from one another but are otherwise identically configurated and are defined by large bores 24a formed in the body 25 of the dispenser 20 which terminate in annular shoulders 26 formed intermediate the bores 24a and relatively smaller connecting bores 27. Inlet passages 28 and 29 lead from bores 27 formed within inlets 22, 23, respectively, and shoulders 30 are formed intermediate the side walls of bores 27 and the passages 28 and 29. Resilient annular flow control members 31 and 32 are seated on the shoulders 30 within inlets 22, 23, respectively, and are effective to control the flow rate of liquids passing through the inlets. The flow control members are of a type well known in the art and have central passageways 33 which are smaller in area than the adjacent passageways 28 and 29 and flex in a downstream direction as the pressure of liquid upstream of the flow controls increases to thereby reduce the effective flow area through the passages 33 and thereby maintain a relative constant rate of liquid flow downstream of the members.

Connecting nipples 35 having base ends 36 and ribbed connecting ends 37 are positioned within the inlets 22, 23 with their respective base ends engaging the annular shoulders 26. O-ring seals 38 are fitted within annular grooves formed about the side walls of the base ends 36 and these members serve to provide a fluid-tight seal between the nipples 35 and the dispenser body. Largeheaded screws 39 are screw-threaded into the dispenser body and have their heads overlapping and engaging the annular surfaces 40 surrounding the nipple extensions 37 to thereby maintain the base ends of the nipples in position in engagement with the shoulders 26 as is shown in the drawings.

Plastic hoses 41, 42 are connected to the nipple extensions 37 and extend through an opening 42 formed in the base wall of the casing 10 and are communicable respectively with sources of syrup and water under pressure which sources are disposed at a point remote from the casing 10.

The dispenser body 20 is formed of a plastic material and has a cylindrical section 45 depending from the main body thereof to define the faucet end of the dispenser. A cylindrical boss 46 is formed integrally with the dispenser body and coaxially of the cylindrical wall 45 and has a nearly cylindrical outer surface 47 which converges slightly toward its distal end and which cooperates with the inner surface 48 of the cylindrical wall 45 to define an elongated annular passageway 49. The annular passageway 49 is in constant open communication with a connecting passage 50 which, in turn, is directly communicable with a horizontally extending passage 51. A closure screw 52 is screw-threaded into the outermost end of the passage 51 and sandwiches a seal 53 between the dispenser body and the head end of the screw whereby to provide a fluid-tight closure for the passage 51. A lead-out passageway 54 opens from the passage 51 to the upper end of the plastic valve body through a truncated conical seat 55.

A syrup passage 56 is formed within the cylindrical boss 46 coaxially of the annular passageway 49 and extends on up through the dispenser body, opening to the upper end thereof through a truncated conical seat 57. The passage 56 has a reduced diameter section 56a at its upper end and opens to a relatively larger diameter section 56b at a junction 56c and the relatively larger diameter portion 56b diverges from its upper end toward the distal end of the boss 46.

Annular grooves 58 are formed within outwardly extending wall sections 59 of the dispenser body which surround the truncated conical seats 55, 57 and the flat annular surfaces 60 immediately surrounding such seats and have rubber seals 61 fitted therein. Armature guides 62 of solenoids 63, 64 have enlarged base sections 65 which terminate in outwardly extending annular flanges 66. The armature guides 62 are positioned on the dispenser body with their outturned flanges 66 engaging and compressing the seals 61 to provide a fluid-tight seal between the guides and the dispenser body. A closure plate 67 has side-by-side apertures formed therein which are slightly larger in diameter than the bases 65 of the armature guides 62 and this closure plate is fitted over the guides with its under surface lying in engagement with the outwardly extending annular flanges 66 and is itself firmly attached to the dispenser body as by screws extending through the plate in a manner well understood by those skilled in the art but not actually shown in the drawings. The plate 67 thus serves to maintain the guides 62 firmly in the position illustrated in the drawings.

Inturned annular shoulders 68 of the guides 62 lead from the base sections 65 to the cylindrical guide portions 69 thereof. The upper outer ends of the guide portions 69 are closed by plugs 70 in the well known manner and have armatures 71 slidably guided therein. The armatures 71 have hexagonally configurated side walls and terminate at their lower ends in resilient valve heads 72, 73. The valve heads 72, 73 are cooperable respectively with seats 55, 57 to control the flow of liquid through passages 54 and 56.

Annular spring seats 74 are fitted about the lower ends of the armatures 71 just above the valve heads and are positively maintained in the illustrated fixed positions and serve as seats for the lower ends of conical compression springs 75. The springs 75 have their large diameter ends seated on the shoulders 68 of armature guides 62 and thereby serve to bias the valve heads into the seated positions illustrated in FIGURE 2.

Plastic encapsulated coils 77 of solenoids 63, 64 are mounted within C-frames 78 over the guide portions 69 of armature guides 62 and are positively maintained in the positions illustrated in the drawings by bolts 79 overlying washers 80 seated on the upper surfaces of C-frames 78 and threaded on outwardly extending threaded extensions 81 of the plugs 70.

Energization of either of the coils 77 will effect retractable movement of the armatures 71 within their respective guides and thereby unseat the valve heads from the seats 55, 57.

Solenoids 63 and 64 are both electrically energized through a single pole normally open switch 83 and solenoid 63 is, in addition, wired in series with single pole normally open switch 84. The switches 83, 84 are mounted within the casing 10 adjacent the dispenser body 20 on fittings 85, 86 rigidly mounted within the casing and have plungers 87, 88, respectively, extending therefrom. Suffice it to say that depression of the plungers effects closure of the switches and energization of the components electrically connected therewith.

Push arm 90 is pivotally mounted within the casing 10 about pin 91 and has a flat extension 92 which passes through an opening 93 formed in the base wall of the casing 10 beneath the faucet 21. A finger 94 at the opposite end of the push arm 90 is positioned in proximity to the plunger 87 so that by placing a drinking glass in engagement with the extension 92 and urging the push arm 90 in a slight counterclockwise direction the finger 94 will contact and depress the plunger 87 and thereby effect closure of the switch 83. As has already been observed, closure of the switch 83 will effect energization of both solenoids 63 and 64. Remembering that the chamber 95, within which the valve head 72 is disposed, opens to passageway 29 and is therefore communicable with a source of water under pressure and that chamber 96, within which valve head 73 is disposed, opens to passageway 28 which is communicable with a source of syrup or concentrate under pressure, closure of the switch 83 will effect energization of both solenoids and unseat the valve heads 72, 73 from their respective seats 55, 57 and cause water and syrup to flow through the passages 54 and 56. Water flowing through the passage 54 will then flow into the passage 51, through passage 50 and annular passageway 49 and thence from the faucet end 21 of the dispenser body 20 to the receptacle placed beneath the faucet. Syrup will flow through passage 56. An actuator bar 83a is pivoted about pin 91 and extends through an opening 83b in the front wall of the casing 10. The bar 83a has a bumper 83c formed integrally therewith and on the back side thereof and this bumper is engageable with the finger 94 which in turn engages the plunger 87 so that depression of the bar 83a will act to retractably move the plunger 87 and thereby effect closure of the switch 83.

A somewhat smaller actuator bar 84a protrudes from the casing through an opening 84b formed therein immediately below the opening 83b and this bar is mounted for pivotal movement about pin 84c. A bumper 84d on the rear face of the bar 84a is engageable with the plunger 88 so that pivotal movement of bar 84a will act through the plunger 88 to close water solenoid control switch 84.

A cap 100 is snap-fitted onto the lower end of the cylindrical wall 45 as may be observed at 101 and has a cylindrical inner wall 102 slightly larger in diameter than the surface 48 of cylindrical wall 45 and this wall terminates in a converging wall section 103 which, in turn, opens to a cylindrical port 104 having a diameter somewhat less than the surface 48 of cylindrical wall 45. The converging wall section 103 is effective to converge the stream of water flowing from the annular passageway 49 and thereby effect a mixing of the water and syrup as it leaves the faucet.

An effervescent control 105 is fitted within the annular passageway 49 and serves to swirl the water as it passes through the annular passage 49 and thereby insure proper mixing of the water and syrup at the faucet head and the swirling action causes reduction in the liquid's effervescence threby permitting the dispensing of a liquid having a gaseous content which means that a more highly carbonated water can be dispensed.

The swirling action is created by a helical rib 106 which is formed about the outer surface of the effervescent control and which has an outer diameter substantially equal to the inner diameter of cylindrical wall 45 so that a helical passage 107 is formed intermediate the effervescent control and that wall 45. A plurality of protuberances 108 are formed integrally with the control and have nibs 109 which engage the surface 48 of cylindrical wall 45 and serve to maintain the control in positive position within the annular passage 49.

An outwardly flared skirt 110 is formed at the lowermost end of this control and this skirt serves to direct the stream of water passing through annular passageway 49 outwardly against the inner surface 102 of cap 100 and thereby further insure adequate mixing of the water and syrup as it leaves the faucet.

Figure 5:
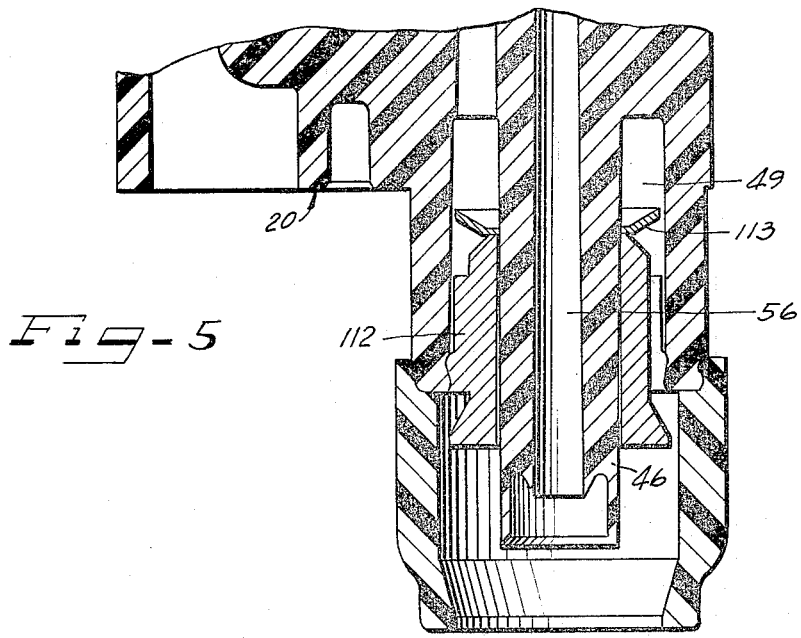
FIGURE 5 is a fragmentary vertical sectional view of the lower portion of the dispenser body of FIGURE 2, illustrating the use of an alternate form of effervescent control.
Figure 6:
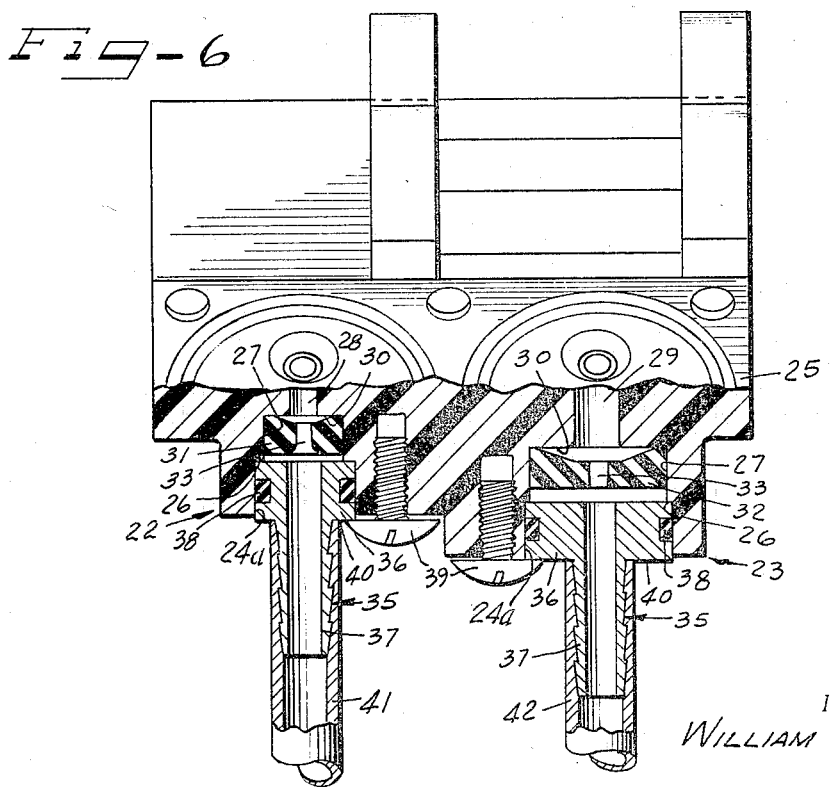
FIGURE 6 is a partially sectioned view of the inlet structure of the liquid dispenser of FIGURE 1, which section is taken along lines I—I FIGURE 1 and which illustrates the positioning of flow control devices within the associated passageways.

In FIGURE 5 there is shown a fragmentary vertical sectional view of the lower section of the dispenser body 20 for the purpose of illustrating an alternate effervescent control 112. In this effervescent control there is no helical thread but there is a baffle washer 113 positioned on the effervescent control. Liquid within the annular passageway strikes the baffle 113 and then flows around the periphery therof along the smooth surface intermediate the effervescent control and the inner surface 48 of cylindrical wall 45 through the faucet. This uninterrupted flow causes an increase in the effervescent rate, giving to the disposed liquid a lower gaseous content which, in this instance, means a less highly carbonated water. The effervescent control 112 would, like its counterpart already described, be snap-fitted into position within the annular passageway 49.

An important feature of the invention resides in the provision of an outwardly extending collar or skirt 115 which is formed integrally with the cylindrical member 46 and which extends past the discharge end of passageway 56 in outwardly spaced relation from the wall of that passageway. The inner wall of the skirt 115 is spaced from the discharge end of the passageway 56 by an annular recessed channel groove 116 and a tapered wall 117 leads from the groove to that passageway discharge end.

The outer end of the skirt 115 has a chamfer 118 formed about the inner wall thereof to provide a sharp skirt lip. This design insures that a fountain operator desiring water alone will get exactly that—uncontaminated with a drop or so of syrup. When flow is shut off there often remains a small drop of syrup at the discharge end of the syrup passage. The skirt 115 and associated recessed channel groove 116 insure that that drop of syrup will remain there and not mingle with the water passing through annular passageway 49.

I claim as my invention:
1. A liquid dispenser comprising:
a dispenser body having first and second liquid inlets leading thereinto.
a passageway member having a first outlet passage formed therein and having a second outlet passage in surrounding relation to said first outlet passage,
flow port communicating said first and second inlets with said first and second outlet passages respectively,
valve means cooperable with said ports for controlling liquid flow therethrough,
said second outlet passage being at least in part a helical groove and causing liquid dispensed therethrough to be swirled about said first outlet passage and controlling the effervescence thereof,
first and second outlets formed at the ends of said first and second outlet passages respectively, and
said second outlet being non-converging relative to said first outlet.

2. A liquid dispenser comprising:
a dispenser body having at least two liquid inlets connected to separate fluid sources,
separate flow passageways formed within said dispenser body and connecting to said inlets,
a first valve means disposed within one of said separate flow passageways,
a second valve means dsposed within another of said separate flow passageways,
valve controls for operating said first valve means and second valve means,
concentric outlets at said dispenser body,
concentric passageways within said dispenser body connecting said separate flow passageways and said concentric outlets,
an effervescent adaptor formed generally as a cylindrical shell and having a first and second end face and having an inner and outer diameter substantially equal to the respective corresponding diameters of the outer of said concentric passageways,
said adaptor having a recess extending from said first end face to said second end face and being removably positioned within the outer of said concentric passageways and forming together therewith a new passageway extending from said first end face to said second end face.

3. A liquid dispenser comprising:
a dispenser body having at least two inlets,
separate flow passageways formed within said dispenser body and connecting to said inlets,
a first valve means disposed within one of said separate flow passageways,
a second valve means disposed within another of said separate flow passageways,
concentric outlets formed in said dispenser body and connecting to said separate flow passageways downstream of said valve means,
an effervescent adaptor having an outer threadlike surface cooperable with the inner surface of the outer of said concentric outlets and defining a flow passageway thereby.

4. A liquid dispenser comprising:
a dispenser body having at least two inlets,
separate flow passageways formed within said dispenser body and connecting to said inlets,
a first valve means disposed within one of said separate flow passageways,
a second valve means disposed within another of said separate flow passageways,
concentric outlets at said dispenser body,
concentric passageways within said dispenser body and respectively connecting said separate flow passageways to said concentric outlets,
an effervescent adaptor formed as a cylindrical shell having a first and second end face and an innermost and outermost diameter substantially equal to the respective corresponding diameters of one of said concentric passageways, said adaptor having a threadlike recess extending from said first end face to said second end face and being snap fitted into said concentric passageway, and said adaptor having a skirt formed at the outlet end thereof, said skirt causing the flow of fluid through the adaptor and outer concentric passageway to diverge from the end of the inner concentric passageway.

5. A liquid dispenser as described in claim 3 wherein said adaptor recess is a helical groove.

References Cited by the Examiner

UNITED STATES PATENTS

| 76,017 | 3/1868 | Burnham | 239—445 |
| 1,080,562 | 12/1913 | Kells | 239—499 |
| 2,597,093 | 5/1952 | Gottlieb et al. | 239—445 |
| 2,984,421 | 5/1961 | Hession | 239—488 |
| 3,093,316 | 6/1963 | Hedeman | 239—445 |
| 3,141,477 | 7/1964 | Campbell et al. | 239—534 |

EVERETT W. KIRBY, *Primary Examiner.*